United States Patent [19]

Jen et al.

[11] Patent Number: 4,711,742

[45] Date of Patent: Dec. 8, 1987

[54] SOLUTION PROCESSIBLE FORMS OF NEUTRAL AND ELECTRICALLY CONDUCTIVE POLY(SUBSTITUTED HETEROCYCLES)

[75] Inventors: Kwan-Yue A. Jen, Flanders; Ronald L. Elsenbaumer, Morristown, both of N.J.

[73] Assignee: Allied Corporation, Morris Township, Morris County, N.J.

[21] Appl. No.: 2,529

[22] Filed: Jan. 12, 1987

Related U.S. Application Data

[63] Continuation-in-part of Ser. No. 740,131, May 31, 1985, abandoned.

[51] Int. Cl.$^4$ ............................................. H01B 1/20
[52] U.S. Cl. .................................... 252/500; 252/512; 252/518; 524/609; 524/610; 524/612
[58] Field of Search .................... 252/500, 512, 518; 524/609, 610, 612

[56] References Cited

U.S. PATENT DOCUMENTS

| | | | |
|---|---|---|---|
| 4,204,216 | 5/1980 | Heeger et al. | 252/500 |
| 4,222,903 | 9/1980 | Heeger et al. | 252/500 |
| 4,321,114 | 3/1982 | MacDiarmid et al. | 204/2.1 |
| 4,442,187 | 4/1984 | MacDiarmid et al. | 429/213 |
| 4,452,727 | 6/1984 | Frommer et al. | 252/518 |
| 4,521,589 | 6/1985 | Yamamoto et al. | 524/609 |
| 4,599,194 | 7/1986 | Frommer et al. | 252/518 |

OTHER PUBLICATIONS

S. Hotta et al., Syn. Metals 1983, 6, 317–318, Electrochemical Preparation of a Poly (3–methylthienylene) Film.

F. Garnier et al., J. Electroanal. Chem., 148, (1983), 299–303, Organic Conducting Polymers Derived from Substituted Thiophenes as Electrochromic Material.

Kaneto et al., J. Chem. Soc., Chem. Commun., 1983, 382, Electrochemical Preparation of a Metallic Polythiophene Film.

Blankespoor et al., J. Chem. Soc., Chem. Commun., 1985, 90, Polymerized 3-Methoxythiophene, A Processable Material for the Controlled Release of Anions.

Tourillon et al., J. Electroanal Chem. 161, (1984) 51–58, Structural Effect on the Electrochemical Properties of Polythiophene and Derivatives.

Tourillon et al., J. Electroanal Chem., 161, (1984) 407–414, Electrochemical Doping of Polythiophene in Aqueous Medium, Electrical Properties and Stability.

Kobayashi et al., Synthetic Metals, 9, (1984), 77–86, Synthesis and Properties of Chemically Coupled Poly (Thiophene).

Tourillon et al., J. Phys. Chem., 1983, 87, 2289–2292, Effect of Dopant on the Physicochemical and Electrical Properties of Organic Conducting Polymers.

Yamamoto et al., Bull. Chem. Soc. Jpn., 56, (1983), 1503–1507, Formation of Adducts of Poly (thienylene)s with Electron Acceptors and Electric Conductivities of the Adducts.

Yamamoto et al., Bull. Chem. Soc. Jpn., 56, (1983), 1497–1502, Preparation and Characterization of Poly(-thyienylene)s.

Horowitz et al., Tellurium–Based Materials, vol. 131, No. 1, 1983, 151, Protection of n-GaAs Photoanodes by Photoelectrochemical Grafting of Poly (3–Methyl-thiophene) and Poly (3,4–Dimethyl-thiophene) Films.

Biserni et al., J. Electrochem. Soc., Electrochemical Science and Technology, vol. 132, No. 7, 1985, 1597, Doped Polydithienothiophene: A New Cathode–Active Material.

Tanaka et al., Makromol. Chem., 185, 1984, 1295–1306, Electrochemical Preparation and Characterization of Poly (2,5–thiophenediyl).

Sato et al., J. Chem. Soc., Commun., 1985, 713, Electrochemical Preparation of Highly Conducting Polythiophene Films.

*Primary Examiner*—Robert Wax
*Attorney, Agent, or Firm*—Richard C. Stewart, II; Gerhard H. Fuchs

[57] ABSTRACT

This invention relates to solutions comprising doped and undoped poly(substituted heterocycles) and an organic solvent which can be used to form conducting polymer articles, including films.

58 Claims, No Drawings

SOLUTION PROCESSIBLE FORMS OF NEUTRAL AND ELECTRICALLY CONDUCTIVE POLY(SUBSTITUTED HETEROCYCLES)

RELATED APPLICATIONS

This application is a continuation-in-part application of U.S. patent application Ser. No. 740,131, filed May 31, 1985, now abandoned.

BACKGROUND OF THE INVENTION

1. Field of the Invention

This invention relates to novel electrically conductive forms of poly(substituted heterocycles), especially poly(substituted thiophenes), and to solutions comprising such polymers either in the conductive form or non-conductive form. Another aspect of this invention relates to a method of using the solution of this invention to form conducting polymer articles, including films, fibers, and coatings and methods of using such solutions as conducting liquids.

2. Prior Art

There has recently been an increased interest in the electrical conductivity of polymeric systems. For example, U.S. Pat. Nos. 4,321,114 and 4,442,187 are directed to conjugated polymers having conjugation in all or a part of at least one backbone chain thereof, such as polyacetylene, polyphenylene, and poly(phenylene sulfide). It has recently been discovered that these conjugated backbone polymers can be chemically doped in a controlled manner with electron acceptor and/or electron donor dopants to produce electrically conducting polymers. Doping procedures and certain representative doped polymers are described in U.S. Pat. Nos. 4,222,903 and 4,204,216.

In the general field of conducting polymers, it is believed very difficult to dope one of these conjugated backbone polymers to the extent that it becomes a good conductor ($\sim 10^{-3}$–100 ohm$^{-1}$cm$^1$) and thereafter dissolve the polymer in any solvent-system. U.S Pat. No. 4,452,727 discloses novel polymer solutions containing a doped sulfur-containing or oxygen-containing aromatic polymer. The solvent of this solution is restricted to Lewis Acid halides having a liquid phase under atmospheric pressure for at least one temperature between $-150°$ C. and $+100°$ C., such as arsenic trifluoride, phosphorus trifluoride, phosphorous pentafluoride, phosphorus trichloride, boron trifluoride and the like. These solutions can be used to form articles, as for example, by casting the solution onto a substrate, and removing the solvent. This solution and method represents a significant advancement over the art; however, it does suffer from certain economic and practical disadvantages resulting from the cost and high environmental reactivity and toxicity of the specific solvents which must be used and the environmental instability of the doped, cast conductive polymer.

A few conductive species of polyalkylthiophenes are known, having been primarily prepared by electrochemical polymerization. Illustrative of such species are poly(3-methylthiophene) and poly(3,4-dimethylthiophene). R. J. Waltman, J. Bargon, and A. F. Diaz, *J. Phys. Chem.*, 1983, 87, 1459-1463. G. Tourillon, D. Govrier, P. Garnier, and D. Viven, *J. Phys. Chem.*, 1984 88, 1049-1051. S. Hotta, T. Hosaka, and W. Shimotsuma, *Syn. Metals.* 1983, 6, 317-318. However, the polymers, prepared electrochemically, are not soluble in solvents such as acetonitrile, propylene carbonate, tetrahydrofuran, dichloromethane, dimethyl formamide, nitrobenzene, nitropropane, toluene, and the like. In the absence of solutions, or plasticized forms, the ability to economically form certain articles out of the conducting forms of these poly(alkylthiophenes), especially semi-conducting and conducting polymer films, fibers, and coatings, is greatly restricted. In fact, the electrochemical methods are reported to give homogeneous polymer films only up to film thickness of about 2000 Å. Powdery deposits are obtained when attempts are made to grow films thicker than this. (G. Tourillon and F. Garnier, *J. Poly. Sci. Poly. Phys. Ed.*, 1984, 22, 33-39.)

The unsubstituted polythiophenes form highly conductive complexes on doping which are not stable in normal environments (containing air or water vapor). However, electrochemically prepared conductive poly(3-methylthiophene) is environmentally stable. (G. Tourillon and F. Garnier, *J. Electrochem. Soc., Electrochem. Sci, Techn.* 1983, 130, 2042-3.

U.S. Pat. No. 4,521,589 describes linear poly(3-alkyl-2,5-thienylene) polymers having from 20 to 100 repeat units which can be used to provide a semiconductor. However, polymers of this sort with only 100 repeat units do not form articles or films with mechanical properties which are generally useful. Although improved solubility is claimed, this patent teaches by example that higher molecular weight fractions become more insoluble. Clearly, improvements are needed and desired to prepare processible high molecular weight and highly conductive polymer compositions which would be of general applicability.

SUMMARY OF THE INVENTION

It has been discovered that certain species of poly(substituted heterocycles) of film forming molecular weight can be dissolved in various common organic solvents, and can be doped by various dopants to form electrically conductive solutions useful for casting conductive films, coatings and other conductive polymer articles. More particularly, one of the embodiments of this invention relates to an electrically conductive doped homopolymer or copolymer of film forming molecular weight, said polymer of the formulae:

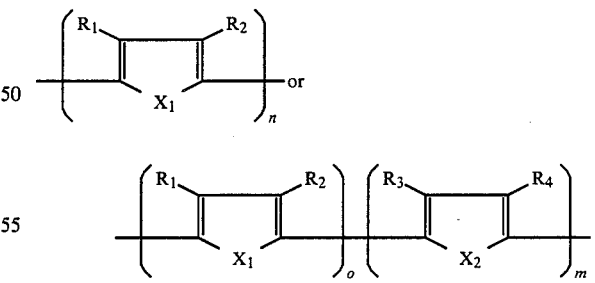

wherein:
  n is a natural number greater than 100;
  o and m are the same or different and are natural numbers, wherein the ratio of m to o can vary from zero to infinity, with the proviso that the sum of o and m is greater than 100;
  $R_1$, is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, or alkyl substituted with one or more sulfonic acid, carboxylic acid, halo, nitro, cyano or epoxy moieties;

R$_2$, R$_3$, and R$_4$ are the same or different at each occurrence and are hydrogen or its isotopes, methyl or R$_1$; or any of R$_1$ and R$_2$, or R$_3$ and R$_4$ substituents taken together are an alkylene or alkenylene group completing a 3, 4, 5, 6 or 7 numbered aromatic or alicyclic carbon ring, which ring may optionally include one or more divalent heteroatoms of sulfur, sulfinyl, sulfonyl or oxygen; and X$_1$ and X$_2$ are the same or different at each occurrence and are S, O, Se, NR$_5$, or PR$_5$, wherein R$_5$ is hydrogen, alkyl or aryl. This solution can be conveniently used to form conductive articles through use of one of the methods of this invention in which the solvent is removed from the solution until the doped polymer solidifies.

Another aspect of this invention relates to a solution which comprises:
(a) an organic solvent; and
(b) a doped or undoped homopolymer or copolymer of film forming molecular weight, said polymer of the formulae:

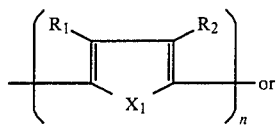

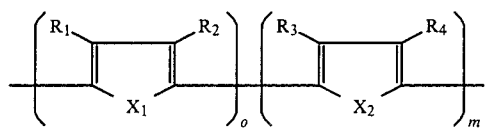

wherein:

n is a natural number greater than 100;

o and m are the same or different and are natural numbers, wherein the ratio of m to o can vary from about zero to infinity, with the proviso that the sum of o and m is greater than 100;

R$_1$ is alkyl, alkenyl, alkoxy, cycloalkenyl, alkanoyl, alkylthio, aryloxy, alkylthioalkyl, alkylaryl, arylalkyl, alkylsulfinyl, cycloalkyl, alkylsulfonyl, aryl, alkoxycarbonyl, arylthio, arylsulfinyl, alkoxyalkyl, alkylthioalkyl, arylsulfonyl, or alkyl substituted with one or more sulfonic acid, cyano, carboxylic acid, halo, nitro, or epoxy moieties;

R$_2$, R$_3$, and R$_4$ are the same or different and are hydrogen or its isotopes, methyl or R$_1$; or any of R$_1$ and R$_2$, or R$_3$ and R$_4$ substituents taken together are an alkylene or alkenylene group completing a 3, 4, 5, 6 or 7 numbered carbon ring, which ring may optionally include one or more divalent heteroatoms of sulfur, sulfinyl, sulfonyl or oxygen; and X$_1$ and X$_2$ are the same or different and are S, O, Se, N$_R$$^5$ or P$_R$$^5$, wherein R$^5$ is hydrogen, alkyl or aryl. Solutions of the doped polymer can be conveniently use to form conductive articles by removing the solvent until the polymer solidified to form an article composed of a conductive or semiconductive polymer. Solutions of the undoped polymer can be used to form conductive articles by removing the solvent until the neutral polymer solidifies, and thereafter doping the solidified neutral polymer through use of a suitable electron acceptor dopant to form an article composed of a conductive or semi-conductive form of said homopolymer or copolymer.

The use of the solutions of this invention in the methods of this invention provides conductive articles of all shapes, as for example, films and fibers which are air stable, free standing and flexible

DETAILED DESCRIPTION OF THE INVENTION

Both solutions of this invention comprise two essential ingredients. One essential ingredient of the solutions is a homopolymer or copolymer of film forming molecular weight, said polymer of formulae:

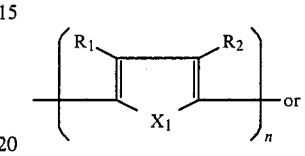

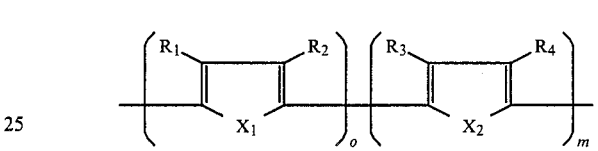

wherein: o, n, m, R$_1$, R$_2$, R$_3$, R$_4$, R$_5$, X$_1$ and X$_2$ are as described above.

Illustrative of such species are homopolymers and copolymers of substituted 2,5-thiophendiyl compounds, where the 2,5-thiophendiyl moiety is selected from the group consisting of 3-butylthiophene, 3-methyl-4-butylthiophene, 3-ethylthiophene, 3,4-diethylthiophene, 3-butoxyethylthiophene, 3-methyl-4-ethoxymethylthiophene, 3-methylthiomethylthiophene, 3-butanoylthiophene, 3-phenoxythiophene, 3-methylsulfonylthiophene, 3-benzylthiophene, 3-phenethylthiophene, 3-propyl-4-methylthiophene, 3-octylthiophene, 3-butoxythiophene, 3-(phenylthio)thiophene, 3-methoxythiophene, 3-(2,4-dimethylphenyl)thiophene, 3-phenylthiophene, 3-propylthiophene, 3-pentylthiophene, 3-hexylthiophene, methyl-4-isopropythiophene, 3-(2,4-dimethoxy phenyl)thiophene, 3-neopentylthiophene, 3-butoxymethylthiophene,3-propylthiomethylthiophene 3-(1-butenyl)thiophene,3-cyclohexylthiophene, 3-butanoylthiophene,3-(phenylsulfonyl)thiophene, 3-chloromethylthiophene,3-(sec-butyl)thiophene, 3-nonylthiophene,3-decylthiophene, 3-isopropylthiophene, 3,4-dipropylthiophene, 3-dodecylthiophene, 3-butoxythiophene, 3,4-(1,4-butanediyl)thiophene, 3,4-(1,2-ethanediyl)thiophene, 3-cyclopentylthiophene 3,4-c-(dihydrothienyl)thiophene, 3-propoxycarbonylthiophene, 3-(naphthylthio)thiophene 3-secbutylthiophene, 3-(3-phenylbutyl)thiophene,3,4-dideuteriothiophene, 3-(3-butenyl)thiophene, 3-(3,4-epoxybutyl)thiophene and the like.

Preferred for use in the practice of this invention are homopolymers and copolymers of the above formula in which:

m, n and o are as described above, with proviso that n, or the sum of m and o are equal to or greater than about 125.

R$_1$ is alkyl having from 2 to about 30 carbon atoms, such as ethyl, propyl, isopropyl, n-butyl, sec-butyl, isobutyl, n-pentyl, isopentyl, sec-pentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkoxy having from 1 to about 30 carbon atoms such as methoxy, ethoxy, and propoxy; alkanoyl having from 1 to 12 carbon atoms such as formyl, acetyl, and propinyl; alkylthio having from 1 to 30 carbon atoms such as methylthio, ethylthio, propylthio,dodecylthio and butylthio; alkenyl having from 1 to about 30 carbon atoms such as allyl, vinyl and 3-butenyl; or phenyl and alkyl substituted with epoxy, sulfonic acid, nitro, cyano, carboxylic acid, or halo substituents such as trifluoromethyl, 3,4-epoxybutyl, cyanomethyl, 2-nitroethyl, 3-chloropropyl, 4-nitrophenyl, —$CH_2CH_2CH_2SO_3H$ and —$CH_2CH_2CH_2CO_2H$;

$R_2$, $R_3$ and $R_4$ are the same or different at each occurrence and are hydrogen, methyl or $R_1$; or any of $R_1$ and $R_2$, or $R_3$ and $R_4$ substituents taken together may form an alkylene or alkenylene chain having from 2 to 30 carbons atoms completing a 4, 5 or 6 membered ring system which may include one or more heteroatoms or oxygen or sulfur such as 1,4-butandiyl, 1,2-ethanediyl, —$CH_2SCH_2$— or —$CH_2OCH_2$—; and $X_1$ and $X_2$ are the same or different and are S, O or $NR_5$.

Particularly preferred for use in the practice of this invention are homopolymers and copolymers of the above-referenced formula wherein $R_1$, $R_2$, $R_3$ and $R_4$ are the same or different, and are hydrogen or alkyl, with the proviso that at least one of the $R_1$ and $R_3$ is alkyl having from 4 to about 20 carbon atoms, $X_1$ and $X_2$ are the same or different and are sulfur or oxygen, and m, n and o are as described above with the proviso that the sum of m and o, or n is equal to or greater than about 150.

Amongst these particularly preferred embodiments, most preferred are those embodiments in which copolymers and homopolymers of substituted thiophenes are used, and wherein the $R_1$ and $R_3$ subtitutents are the same or different and are alkyl with the proviso that at least one of $R_1$ and $R_3$ is alkyl having from 5 to 20 carbon atoms and $R_2$ and $R_4$ are hydrogen, and m, n and o are as described above with the proviso that the sum of m and o, or n is equal to or greater than about 200. Experimentation has demonstrated that an especially useful copolymer for use in this invention is the copolymer of 3-(n-octyl)thiophene and 3-methylthiophene.

Copolymers for use in this invention may be block copolymers, random copolymers or may be stereoregular polymers in which the differing monomeric units alternate regularly throughout the polymer backbone. The conductivity of the polymer may vary widely depending on whether it is random or stereoregular polymers. Experimentation has shown that stereoregular polymers exhibit the highest conductivities and are therefore preferred for use in the invention.

The homopolymers and copolymers useful in the practice of this invention are those which are of "film forming molecular weight". The upper molecular weight of the polymer is not critical provided the molecular weight is not so high that the solubility of the polymer is so adversely affected that solutions of the polymer cannot be cast. As used herein, "film forming molecular weight" generally means number average molecular weights which are equal to or greater than about 15,000. Such polymers generally can be used to form thin, freestanding film which are coherent and retain their shape, and preferably are not brittle when bent. An advantage of this invention is that these polymers of film forming molecular weights are soluble in common organic solvents. Because of the higher molecular weights of these polymers as compared to the lower molecular weight polymers of U.S. Pat. No. 4,521,589, solutions of these higher molecular weight polymers can be casted on substrates to form coatings without the need for binders, i.e., polymer compositions which bind and improve the stability of the polymers, which is generally not true of the low molecular weight polymers of U.S. Pat. No. 4,521,589.

The molecular weight at which any polymer will be film forming may vary widely, depending on a number of factors, including the number of repeat units, the number of substituents and the substituent patterns. Usually, poly(substituted heterocycles) of film forming molecular weight are those where the number of repeat units is in excess of 150. In the preferred embodiments of this invention, the number of repeat units is at least about 150, and in the particularly preferred embodiments is at least about 200. Amongst these particularly preferred embodiments most preferred for use in the conduct of this invention are poly(substituted heterocycles) having at least about 250 repeat units, with those having at least about 300 repeat units being the poly(substituted heterocycles) of choice.

Useful copolymers and homopolymers can be prepared through use of conventional chemical and electrochemical procedures well known to those of skill in the art. For example, such materials can be prepared chemically by treating the corresponding 2,5-dihalo(bromo or iodo) monomer with magensium metal and Ni-catalyst in tetrahydrofuran or other ether solvents. This procedure is described in greater detail in M. Kobayashi, J. Chen, T. C. Chung, F. Moraes, A. J. Heeger and F. Wudl, *Syn. Metals,* 1984, 9 77–86 and T. Y. Yamamoto, K. Sanechika, and Y. Yamamoto, *Bull. Chem. Soc. Japn.* 1983, 56, 1497–1502, which are incorporated herein by reference. Useful co-polymers and homopolymers of substituted thiophenes can also be prepared electrochemically by anodic oxidation/polymerization of suitable monomers or mixtures of monomers in a solvent/electrolyte system in which the formed conductive polymer is insoluble and separates out of solution as a coating on the anode.

The second essential ingredient of the solutions of this invention is an organic solvent. Indeed, one of the surprising aspects of this invention is that poly (substituted heterocycles) in the doped and/or neutral form can be dissolved in common organic solvents and that such solvents as the Lewis acid halides described in U.S. Pat. No. 4,452,727 are not required. The type of solvent employed can vary widely, from polar to nonpolar. In general, solvents which can be used in the practice of this invention will have a dipole moment greater than zero and less than or equal to about 5, and a dielectric constant of less than about 70.

Illustrative of useful solvents are sultones, such as propane sultone, butane sultone, pentane sultone and the like; alkyl alkane sulfonates such as methyl methane sulfonate, ethyl methane sulfonate, butyl methanesulfonate, propyl ethane sulfonate and the like; linear and cyclic ethers such as 1,2-dimethoxy ethane, dimethoxymethane, dioxane, glymes, diglymes, tetrahydrofuran, 2-methyltetrahydrofuran, anisole, diethylether and the like; nitriles such as acetonitrile, propionitrile, butyronitrile, benzonitrile and the like; hydrocarbons such as cyclohexane, pentane, hexane and cyclopentane; halocarbons such as carbon tetrachloride, dichloromethane, and 1,2-dichloroethane, aromatic solvents such as benzene, toluene, xylene, nitrobenzene and the like; ketones such as 4-methyl-2-pentanone, methylethylketone, acetone, and the like; carbonates such as propylene carbonate, dimethyl carbonate, ethylene carbonate and the like; esters such as methyl formate, methyl acetate, γ-butyrolactone, ethyl acetate and the like; nitroalkanes, such as nitromethane, nitroethane, nitropropane, and the like; amides such as dimethyl formamide, dimethyl thioformamide, N,N-dimethyl acetamide, N-methylpyrrolidinone and the like; organophosphorus compounds such as hexamethyl phosphoroamide, diethylphosphate, triethylphosphites, trimethylphosphate and the like; and organosulfur compounds such as sulfolane, methyl sulfolane, dimethyl sulfone, dimethyl sulfoxide, dimethyl sulfolane, glycol sulfite, tetraethylsulfamide and the like. Mixtures of such organic solvents can also be used as for example mixtures of sulfolane and acetonitrile.

Solvent selected for use in any particular situation will depend primarily on the polarity of various $R_1$, $R_2$, $R_3$ and/or $R_4$ substituents and/or the state of the polymer, i.e. doped or undoped. In general, more polar substituents and higher doping levels of the polymer, will require solvents with higher dielectric constants and dipole moments (within the above specified range). Conversely, less polar substituents and lower doping levels of the polymer, will require solvents with lower dielectric constants and dipole moments (within the above specified ranges).

In general, solvents chosen for use with doped polymers and/or those having relatively polar substituents will usually have a dipole moment of from about 0.3 to about 5.0, preferably from about 2.5 to about 5.0; and a dielectric constant of from about 2.0 to about 70, preferably from about 20 to about 65. Illustrative of such solvents are linear and cyclic ethers, such as tetrahydrofuran, tetrahydropyran, 2-methyltetrahydrofuran, diethylether, diglyme, glyme and the like; halocarbons such as chloroform, 1,2-dichloroethane, dichloromethane and the like; amides, such as dimethylformamide, N,N-dimethylacetamide, N-methyl pyrrolidone and the like; substituted aromatics, such as xylene, anisole, toluene and the like; nitriles, such as acetonitrile, propionitrile, benzonitrile, butyronitrile, and the like; sulfoxides and other sulfur containing solvents such as dimethylsulfoxide and the like; nitro substituted alkanes and aromatics such as nitromethane, nitropropane, nitrobenzene and the like; and carbonates such as propylene carbonate, ethylene carbonate and the like.

In general, solvents chosen for use with undoped polymers and/or those having relatively non-polar substituents will have a dipole moment of from about 0 to about 3.0, preferably from about 0 to about 2.0; and a dielectric constant of from about 2.0 to about 35, preferably from about 2.0 to about 20. Illustrative of such solvents are halocarbons such as dichloromethane, and the like; aromatic solvents such as toluene, xylene, benzene and the like; cyclic and linear ethers such as dimethoxyethane, tetrahydrofuran and the like; hydrocarbons such as hexane, pentane, cyclohexane and the like; esters such as ethylacetate, methyl formate and the like; sulfoxides, such as dimethylsulfoxide and the like; cyclic and linear amides, such as dimethylformamide, N-methylpyrrolidone, N,N-dimethylacetamide and the like; and ketones such as acetone and the like.

The solution of this invention which contains the doped polymer and is electrically conductive includes a third essential ingredient which is an electron acceptor dopant solute. The purpose of the dopant is to dope the polymer, and render it electrically conductive both in solution, and in the solid article derived from the solution. In general, such a solute is derived from a compound which upon addition to the polymer ionizes the polymer with co-committent formation of a neutral species and anionic dopant solute species. The dopant for use in the practice of this invention can vary widely and can be such materials which are known in the art for use in doping conjugated backbone polymers to form conductive or semi-conductive polymers, as for example those described in detail in U.S. Pat. Nos. 4,442,187 and 4,321,114 which are hereby incorporated by reference. Such useful dopants can be electron donor dopants and electron acceptor dopants. Illustrative of useful electron acceptor dopants are $I_2$, $AsF_5$, $AlCl_3$, $NO^+$ and $NO_2^+$ salts (such as $NOBF_4$, $NOPF_6$, $NOSbF_6$, $NOAsF_6$, $NOCH_3SO_3$, $NO_2BF_4$, $NO_2PF_6$, $NO_2AsF_6$, $NO_2SbF_6$, and, $NO_2CF_3SO_3$), $HClO_4$, $HNO_3$, $H_2SO_4$, p-toluenesulfonic acid (TsOH), benzoylperoxide, $CF_3SO_3H$, $SO_3$, $Br_2$, $(FSO_3)_2$, $FSO_3H$, $Fe(ClO_4)_3$, $FeCl_3$, $Fe(OTs)_3$, and $Fe(CF_3SO_3)_3$ which give rise to doped polymers containing dopant solutes such as $I_3^-$, $NO_3^-$, $BF_4^-$, $PF_6^-$, $AsF_6^-$, $SbF_6^-$, $CF_3SO_3^-$, $ClO_4^-$, $-OTs$, $SO_3^-$, $C_6H_5CO_2$, $Br_3^-$, $CH_3SO_3^-$, $FSO_3^-$, and $FeCl_4^-$. Other useful electron acceptor dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$, $AgOTs$, and the like, which can be dissolved in a suitable solvent and used to dope the homopolymer or copolymer by electrochemical oxidation of the polymer at the anode of an electrochemical cell.

Useful electron donor dopants can vary widely and include those described in detail in U.S. Pat. Nos. 4,321,114 and 4,442,187. Illustrative of suitable electron donor dopants are the alkali metal (Li, Na, K, Rb and Cs) naphthalides and tetra-alkyl ammonium salts of benzophenone ketyl.

Preferred for use in the practice of this invention are electron acceptor dopants. While we donot wish to be bound by any theory, it is believed that solid articles composed of polymers doped with electron acceptor dopants are more stable to air. Particularly preferred for use in the conduct of this invention are electron acceptor dopants which give rise to doped polymers containing, the following dopant solutes: $I_3^-$, $CF_3SO_3^-$, $CH_3SO_3^-$, $NO_3^-$, $TsO^-$, $FeCl_4^-$, $SbF_6^-$, $PF_6^-$, $BF_4^-$, $ClO_4^-$ and $PhCO_2^-$.

The proportion of polymer and solvent in the solution of this invention containing the neutral copolymer or homopolymer and the organic solvent; and the solution containing the doped polymer and solvent are not critical and can vary widely. However, the following guidelines are believed important for achieving solutions particularly useful in the present invention. In general, the amount of solvent as a proportion of the amount of solution is not believed to be critical, since any amount as a liquid will form at least a viscous gel with doped or undoped polymers. These viscious embodiments of the invention are particularly useful for silkscreening conductive circuitry and for applying thick film coatings on substrates. For other applications, it may be preferred, however, to use sufficient liquid solvent to lower the viscosity of the gel or solution to a point where it flows at least sufficiently to conform to a container shape or mold in a reasonably short period of time, e.g., in 30 minutes or less. Preferably, the solvent is present in sufficient amounts to lower the viscosity of the solution to less than about 2,000 centipoise, and more preferably from about 1 to about 1000 centipoise.

The amount of dopant employed in the solution of the doped homopolymer or copolymer is also not believed to be critical and can vary widely. In general, the amount of dopant employed is sufficient to provide a solution which is a semi-conductor or a conductor. In general, the amount of dopant employed is at least sufficient to provide a solution having an electrical conductivity equal to or greater than about $10^{-7} \text{ ohm}^{-1} \text{ cm}^{-1}$. The upper conductivity is not critical, and usually the highest conductivity which can be obtained is provided. In the preferred embodiments of the invention, the amount of dopant employed is at least sufficient to provide a solution having an electrical conductivity equal to or greater than about $10^{-3} \text{ ohm}^{-1} \text{ cm}^{-1}$, and in the particularly preferred embodiments, an amount at least sufficient to provide a solution having a conductivity equal to or greater than about $10^{-1} \text{ ohm}^{-1} \text{ cm}^{-1}$. Amongst these particularly preferred embodiments, most preferred are those embodiments of the invention in which the amount of dopant is at least sufficient to form a solution having an electrical conductivity equal to or greater than about $10^{1} \text{ ohm}^{-1} \text{ cm}^{-1}$.

In addition to the essential copolymer or homopolymer, dopant and solvent, or copolymer or homopolymer and solvent, whichever is applicable, the solutions of this invention can include other optional ingredients which either dissolve or do not dissolve in the solution. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional polymers such as polyacrylonitrile, polyvinylidine chloride, polyethylene oxide, polystyrene, nylon, celulose acetate butyrate, celulose acetate, polyacrylic acid, polyvinyl sulfonic acid, polyphenylene oxides and the like. In the case of non-soluble fourth components, materials may be present which either fill or form a substrate for the conductive polymer cast from the solution. These fourth components include other conductive polymers, other polymers such as polyacetylene which may become conductive upon doping, graphite, glass beads, other polymer blends, metal conductors, reinforcing fibers and inert fillers (such as clays and glass).

The method of forming the solutions of this invention is not critical and can vary widely. For example, one preferred method of forming the present solution containing the doped homopolymer or copolymer is to react, simultaneously, the polymer, the dopant and the solvent as a liquid. Thus, for example, by introducing poly(3-hexylthiophene) as a solid powder, toluene as a liquid and iodine as a solid into a mixing vessel, a solution of the doped polymer is quickly formed, from which conductive polymer can be cast. The conditions of such mixing are not critical, provided that sufficient iodine is used to dope the desired quantity of polymer and sufficient solvent is employed to reduce the viscosity of the solution to manageable levels. An alternate technique of preparing the solution of this invention containing the doped polymer is to mix first the polymer and the solvent, which can form a homogeneous solution or remain as a two-phase system almost indefinitely depending on the solvent chosen and thereafter add the dopant to the solution or two phase system. Thus, for example, if poly(3-(n-butyl)thiophene) powder is admixed with acetonitrile solvent, the powder will remain on or suspended in the solvent for extended periods under normal conditions. The addition of a dopant to this suspension, such as iodine, causes the powder to be doped and, almost instantaneously thereafter, causes the doped polymer to go into solution. Similarly, poly(3-n-(butyl)thiophene) can be added to toluene or nitropropane forming a solution to which a dopant such as iodine can be added. A second alternate technique for forming the solution of this invention containing the doped homopolymer or copolymer is to form the dopant solute from part of the solvent, either in the presence of the polymer solute or followed by addition of polymer solute. Thus, for example, adding poly(3-(n-butyl)thiophene) to a solvent such as $CF_3SO_3H$ produces a solution of the polymer doped with $CF_3SO_3-$. Yet another alternate technique for forming the solution of the doped polymer is to prepare the polymer by treating the corresponding monomer or momomers (dissolved in a solvent in which the desired homopolymer or copolymer is soluble) with a strong Lewis oxidant such as $AsF_5$, $FeCl_3$, and $NO^+$ and $NO_2^+$ salts to form a solution of the doped polymer; or subjecting the monomer or mixture of monomers to anodic oxidation/polymerization in a solvent/electrolyte system to directly form the doped polymer in solution.

The solution of this invention which contains the neutral polymer can be prepared merely by dissolving the polymer in a solvent in which it is soluble. For example, solutions of poly(3-(n-octyl)thiophene) can be conveniently prepared merely by adding the desired amount of the polymer to a solvent, such as toluene or nitropropane, in which the polymer is soluble.

Various methods are contemplated for using the solution of the present invention. First, with regard to solutions of both the conductive doped polymer and the neutral polymer, it is contemplated to remove the solvent from the solution to allow the copolymer or homopolymer to solidify. In the case of the solution of the doped polymer, excess dopant precursor, if present may be removed from the solution by some suitable conventional method if desired. The solvent can be removed from the solution through use of any conventional solvent removal method but is removed preferably by evaporation. Alternatively, the solvent and dopant precursor can be removed by extraction with an extractant in which the solvent and dopant precursor are substantially more soluble than the doped polymer.

As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold. It is contemplated that, if fourth or additional soluble components are introduced into the solution, they will, unless also volatile, be present in the shaped article formed. If the fourth component is a non-volatile liquid, then the removal of volatile components may leave a new liquid or plasticized form of doped conducting polymer or undoped neutral polymer. If the additional components are volatile, then foamed or expanded cellular forms of the polymer may be formed.

In those embodiments of the invention in which the solution contains a doped polymer, a conductive article is formed upon removal of the solvent. However, in those embodiments of the invention in which the solution contains a neutral polymer, the resulting article must be contacted with a suitable dopant to render the article conductive or semiconductive. For example, a solution of neutral copolymer, poly(3-(n-octyl)thiophene-co-3-methylthiophene) (50:50), can be prepared by dissolving the polymer in a solution such as tetrahydrofuran, toluene or nitropropane, Solvent can removed from solution forming an article composed of the neutral polymer. Thereafter, the polymer article is exposed to a suitable electron acceptor dopant as for example iodine or nitrosonium salts dissolved in a solvent in which the neutral and doped polymer are not soluble for a time sufficient to dope the polymer article to the desired extent. The upper conductivity of the polymer article is not critical, and usually the highest conductivity which can be obtained is provided. In general, the polymer article has an electrica conductivity equal to or greater than $10^{-7}$ ohm$^{-1}$ cm$^{-1}$. In the preferred embodiments of the invention, doping is continued until the electrical conductivity of the polymer article is equal to or greater than about $10^{-3}$ ohm$^{-1}$ cm$^{-1}$ and, in the particularly preferred embodiments doping is continued until the electrical conductivity is equal to or greater than about $10^{-1}$ ohm$^{-1}$ cm$^{-1}$. In the most preferred embodiments, doping is continued until conductivities equal to or greater than about $10^1$ ohm$^{-1}$ cm$^{-1}$ are obtained.

In the event that fourth or additional non-soluble components are present (or suspended) in the solution, the doped polymer will form around, or be filled with, the insoluble material. If, for example, the additional components are glass fibers, the relative amounts of fibers and doped polymer remaining will cause either the polymer to be fiber-filled, the fibers to be polymer impregnated, or some intermediate composite of fibers and doped polymer to be formed. In the case of systems wherein the amount of non-soluble component greatly exceeds the doped polymer remaining, individual particles or shapes of non-soluble components coated or impregnated with doped polymer will be formed. Examples of articles formed from non-soluble components and the present polymer solutions include conductive polymer coated-housings for sensitive electronic equipment (microporcessors), infrared and microwave absorbing shields, flexible electrical conducting connectors, conductive bearings and brushes and semiconducting photoconductor junctions.

It is also contemplated to use the present solutions as such as either liquid conductors or liquid semiconductors, much in the manner that liquid mercury is used in various devices. Examples of such devices include gravity switches, fluid level detecting devices or other electrical or electronic switches. Such use is based upon the conductivity of the doped solution, which the case of poly(3-butylthiophene) doped with iodine in toluene can represent a relatively high conductivity (from about $10^{-7}$ to about $10^{-2}$ ohm$^{-1}$ cm$^{-1}$) which appears to be predominantly of an electronic rather than ionic nature.

A fourth application for the present polymer solutions is in the doping of other materials, and especially other conjugated backbone polymers which could also be doped by the electron-acceptor dopant alone. Such doping may occur as a part of the process of casting the polymer solution onto the second polymer article, but may also be accomplished without, necessarily, casting the conductive polymer from the solution.

The following specific examples are present to illustrate the invention and are not to be construed as limitations thereon.

EXAMPLE 1

Preparation of poly(3-butylthiophene) Doped With I2

A. To a stirred solution of 3-butylthiophene (5.6 g) in dichloromethane (25 ml) was added finely powdered iodine (10.16 g) in one portion at room temperature. A solution of concentrated nitric acid (3.36 ml) in water (3.36 ml) was added dropwise at such a rate to maintain a gentle reflux of the dichloromethane. After refluxing for three more hours, the organic layer was separated, washed successively with water (2×50 ml), sodium thiosulfate solution (1×50 ml), and dried over anhydrous sodium sulfate, and the dried solution was even evaporated to provide a crude product, which was purified by column chromatography (silica) with pentane as eluent to give pure 2,5-diiodo-3-butylthiophene (11.8 g).

B. To a stirred solution of 2,5-diiodo-3-n-butyl thiophene (3.92 g, 0.01 mole), prepared as in Step A, in dry 2-methyl-tetrahydrofuran (20 ml) at room temperature under nitrogen was added magnesium turnings (0.243 g, 0.01 mole). After the mixture was gently refluxed overnight, dibromo[1,3-bis(diphenylphosphino)propane] nickel (II) (0.15 g) was added in one portion as the catalyst for the polymerization. The mixture was refluxed overnight, then filtered to remove a fine precipitate. The filtrate was evaporated to give a crude product which was then extracted with aqueous HCl, water and ethanol. The polymer was further purified by Soxhlet extraction with tetrahydrofuran. The Tetrahydrofuran soluble fraction (>95% of the total) was found to have an average molecular weight of 41,400 corresponding to a degree of polymerization of 300. Free standing films of the neutral polymer were cast from toluene. Earlier preparations using dichloro-[1,3-bis(diphenylphosphino)propane] nickel II as the polymerization catalyst afforded poly(3-n-butylthiophene) with lower average molecular weights: (Mn~16,500, corresponding to a degree of polymerization of approximately 120) which did not afford free standing polymer films on casting from toluene solution (brittle and cracked after drying).

C. To a stirred solution of poly(3-n-butylthiophene) (0.1 g) prepared as in Step B in dichloromethane (5 ml) was added a solution of excess iodine in dichloromethane in one portion. A black solid immediately precipitated. After stirring for an additional 5 minutes, the solid was filtered and washed several times with nitromethane, then vacuum dried. The black solid was pressed into a disk-shaped pellet 7 mm in diameter using a KBr die. The conductivity was measured using a four-in-line probe with 1 mm spacings. The two outer probes were connected to a Keithley Model 225 constant current source. The inner two probes were connected to a Keithley Model 616 Electrometer for voltage measurement.

The conductivity of the pellet was calculated to be 3.16 ohm$^{-1}$cm$^{-1}$, by using the formula:

$$\delta = \frac{\ln 2}{\pi d} \cdot \frac{I}{V}$$

where "d" is the sample thickness (0.09 cm), "I" is the constant current passed through the outer probes (1mA), and "V" is the measured voltage drop across the inner two probes (0.7754 mV).

D. A free standing film prepared as in B was subjected to a solution of NOSbF$_6$ in nitromethane at room temperature for 3 min. The doped polymer was washed with fresh nitromethane and dried. The flexible free-standing doped film had a conductivity of 6 S/cm as measured by the method described above.

COMPARATIVE EXAMPLE 2

Preparation of Iodine Doped Poly(3-Methylthiophene)

Using the procedure of Example 1, 3-methylthiophene (9.82 g) dissolved in dichloromethane (60 mL) was reacted with iodine (25.4 g) to provide 19.8 g of 2,5-diiodo-3-methylthiophene, 7 g of which was in turn treated with magnesium turnings (0.486 g) in dry tetrahydrofuran followed by refluxing in the presence of dichloro[1,3-bis-(diphenylphosphino)-propane]nickel (II) (0.3 g) to form a suspension of poly(3-methylthiophene). The crude polymer was extracted with hot acetone and tetrahydrofuran to remove soluble, low molecular weight oligomers. The insoluble fraction was found to have an average molecular weight of 8450 (degree of polymerization of 88). The iodine doped poly(3-methylthiophene) was then prepared by treatment of a stirred suspension of the insoluble fraction of poly(3-methylthiophene) (0.3 g) in dichloromethane (15 ML) with a solution of excess iodine in dichloromethane. The doped polymer was isolated from the suspension and the conductivity was determined to be 2.7 ohm$^{-1}$cm$^{-1}$.

EXAMPLE 3

Preparation of Iodine Doped Poly(3-ethylthiophene)

Using the procedure of Example 1, 3-ethylthiophene (4.49 g) dissolved in dichloromethane (25 mL) was reacted with iodine (10.16 g) to provide 10.2 g of 2,5-diiodo-3-ethylthiophene, 3.64 g, which was in turn polymerized into poly(3-ethylthiophene) by treatment with magnesium turnings (0.243 g) in dry tetrahydrofuran followed by refluxing in the presence of dichloro[1,3-bis-(diphenylphosphino)-propane]nickel (II) (0.25 g). The iodine doped poly(3-ethylthiophene) was then prepared by treatment of a stirred solution of poly(3-ethylthiophene) (0.3 g) in dichloromethane (20 ML) with a solution of excess iodine in dichloromethane. The doped polymer was isolated from the solution and its conductivity was determined to be 3.5 ohm$^{-1}$cm$^{-1}$.

EXAMPLE 4

Solubility Studies (A) Solubility of Iodine Doped and Conductive Forms of Poly(3-methyl-thiophene), Poly(3-ethylthiophene) and Poly(3-butylthiophene)

A number of experiments were conducted to determine the relative solubilities of the iodine doped and conductive forms of poly(3-methylthiophene), poly(3-ethylthiophene) and poly(3-butylthiophene).

The procedure employed was as follows: Into a small flask was placed 1 g of the doped polymer followed by the addition of 10 ml of the desired solvent at room temperature. If the doped polymer did not dissove at room temperature, the solvent was warmed to its boiling point and the solubility noted. The results of these experiments are set forth in the following Table I. In Table I, the following abbreviations are used:

(a) "VS" is very soluble;
(b) "S" is soluble;
(c) "SS" is slightly soluble;
(d) "I" is insoluble;
(e) "Polymer I" is poly(3-(n-butyl)thiophene);
(f) "Polymer II" is poly(3-ethylthiophene);
(g) "Polymer III" is poly(3-methylthiophene); and
(h) "-" indicates no evaluation.

TABLE I

| Exp. No. | Solvent | Polymer I Neutral | Polymer I I2 Doped | Polymer II Neutral | Polymer II I2 Doped | Polymer III Neutral | Polymer III I2 Doped |
|---|---|---|---|---|---|---|---|
| 1 | CH$_2$Cl$_2$ | VS | S | S | SS | I | I |
| 2 | Toluene | VS | S | S | SS | I | I |
| 3 | Tetrahydrofuran | VS | VS | S | S | I | I |
| 4 | Dimethylformamide | VS | S | S | S | I | I |
| 5 | Acetonitrile | I | S | I | I | I | I |
| 6 | Nitromethane | I | SS-S | I | SS | I | I |
| 7 | Nitropropane | S | S | S | S | I | I |
| 8 | Acetone | I | I | SS | I | I | I |
| 9 | Ethylacetate | SS | I | SS | I | I | I |
| 10 | Hexane | S | SS | SS | SS | I | I |
| 11 | Water | I | I | I | I | I | I |
| 12 | Ethanol | I | I | I | I | I | I |
| 13 | Propylene Carbonate | I | S | SS | SS | SS | SS |
| 14 | Dimethoxyethane | S | S | S | SS | I | I |
| 15 | Dimethylsulfoxide | S | S | S | SS | — | — |
| 16 | Xylene | VS | SS | VS | S | I | I |
| 17 | Nitrobenzene | SS | S | SS | SS | SS | SS |
| 18 | N—Methyl pyrrolidone | SS | S | SS | SS | SS | SS |
| 19 | Dimethylacetamide | S | S | S | S | — | — |
| 20 | Benzonitrile | S | S | S | S | — | — |

The iodine doped and conductive complex of high molecular weight poly(3-butylthiophene) was found to be soluble in tetrahydrofuran, toluene, $CH_2Cl_2$, nitropropane, nitromethane, propylene carbonate, nitrobenzene, xylene, dimethoxyethane, dimethylformamide, dimethylacetamide, dimethylsulfoxide, N-methylpyrrolidone and benzonitrile at room temperature from which the conductive form could be recast. The iodine-doped poly(3-methylthiophene) was found to be insoluble in all solvents at room temperature but dissolved in nitrobenzene and N-methylpyrrolidone at elevated temperatures from which (on cooling) the conductive form precipitated.

B. Solubility of Conductive Poly(3-butylthiophene) Doped With $SbF_6^-$.

To a solution of poly(3-butylthiphene) of MW>38,000 in nitrobenzene was added a solution of $NOSbF_6$ in nitromethane (0.25 mol. equivalents per 3-butylthiophene repeat unit). The solution turned from red to deep blue with the addition. The doped polymer remained in solution indefinitely (no signs of precipitation even after standing for 6 months at room temperature). A portion of the conductive polymer solution was evaporated to give a free standing film with a 4-probe conductivity of 0.5 S/cm.

A similar experiment was repeated using other solvents. The following solvents were found to dissolve the doped and conductive polymer: nitropropane, benzonitrile, butylnitrile, chloroform, dimethylformamide and dimethylsulfoxide.

EXAMPLE 5

Stability Studies

The relative stability of the iodine doped complexes of poly(3-methylthiophene), poly(3-ethylthiophene) and poly(3-butylthiophene) were determined by subjecting the doped polymers to dynamic vacuum for 24 hours and determining the conductivity of the polymer. The results of these experiments show that the relative stability of the iodine doped complexes follows the order n-butyl>ethyl>>methyl. The butyl derivative lost no weight and its conductivity remained unchanged; the ethyl derivative lost a moderate amount of weight and dropped by 20% in conductivity; and the methyl derivative lost nearly all of its iodine dopant and conductivity ($<10^{-4}$ ohm$^{-1}$cm$^{-1}$).

EXAMPLE 6

The Preparation of Poly(3-(methylthio)thiophene)

A. To a stirred solution of 3-bromothiophene (3.26 g, 0.02 mole) in dry ether (50 ml) at $-78°$ C. ($N_2$) was added dropwise 1 equivalent of n-butyllithium. After stirring at $-78°$ C. for 1 hour, sulfur powder (0.64 g, 0.02 mole) was added in one portion. After further stirring for 0.5 hour, the mixture was warmed to 0° C. and excess methyliodide (2 ml) was added dropwise. The mixture was stirred at room temperature for 0.5 hour and then quenched with water. The organic layer was washed with water ($2\times100$ ml), dried over anhydrous sodium sulfate, evaporated, and distilled under reduced pressure (76°-82° C.) to give pure 3-methylthiothiophene (1.82 g).

B. To a stirred solution of 3-(methylthio)-thiophene (5.2 g, 0.04 mole) in $CCl_4$ (100 ml) was added dropwise a solution of $Br_2$ (0.08 mole) in $CCl_4$ (50 ml). The mixture was stirred at room temperature overnight, then washed with aqueous sodium thiosulfatesodium hydroxide solution, dried over anhydrous sodium sulfate, and condensed to give a crude product. Passage through a short column (silica) with pentane as eluent gave a pure product (7.2 g).

C. To a stirred solution of 2,5-dibromo-3-methylthiothiophene (4.32 g, 0.015 mole) in dry tetrahydrofuran (40 ML) at room temperature under nitrogen was added magnesium turnings (0.365 g, 0.015 mol). After the mixture was gently refluxed over night, dichloro[1,3-bis(diphenylphosphino)propane] nickel (II) (0.25 g) was added in one portion as the catalyst for the polymerization. The mixture was refluxed over night, then filtered to remove a fine precipitate. The filtrate was evaporated to give a crude product which was then soxhlet extracted with ethanol. The polymer was further purified by passage through a short column (silica) using $CH_2Cl_2$ as eluent (0.9 g).

D. To a stirred solution of poly(3-(methylthio)thiophene (0.25 g) in $CH_2Cl_2$ (10 ml was added excess $I_2$ as a solution is $CH_2Cl_2$. A solid precipitated which was isolated by filtration washed with $CH_2Cl_2$ and vacuum dried. The conductivity of the solid iodine doped poly(3-(methylthio)thiophene) was 0.5 ohm$^{-1}$ cm$^{-1}$ as determined by the method described in Example 1.

COMPARATIVE EXAMPLE 7

The Preparation of Poly(3-Methylthiophene)Doped with $NOSbF_6$, $NOPF_6$, and $NOBF_4$ To a stirred solution of $NOSbF_6$ (200 mg) in $CH_3NO_2$ (10 ml) was added poly(3-methylthiophene) (200 mg) powder in one portion at 0° C. ($N_2$). The solid polymer turned blue immediately with the release of a brown gas but did not dissolve in the solvent. After stirring at 0° C. for 10 minutes, the blue-black powder was filtered and washed several times with $CH_3NO_2$ and $CH_2Cl_2$ to remove excess dopant. After drying under vacuum, the powder was pressed into a disk-shaped pellet 7 mm in diameter using a KBr infrared die. The conductivity of the pressed pellet was 2.3 ohm$^{-1}$cm$^{-1}$ as measured by the four-point probe technique described in Example 1. Poly(3-methythiophene) similarily doped with $NOPF_6$ and $NOBF_4$ gave doped insoluble polymers with conductivities of 3.5 and 3.8 ohm$^{-1}$cm$^{-1}$, respectively.

EXAMPLE 8

Preparation of Poly(3,4-dimethylthiophen-2,5-diyl) Doped with $NOSbF_6$

Poly(3,4-dimethylthiophen-2,5-diyl) was prepared according to the procedure of Example 1 using 2,5-diiodio-3,4-dimethylthiophene. The yellow neutral polymer is insoluble in common organic solvents at room temperature. On doping with $NOSbF_6$ by the procedure of Example 7, the doped complex displays a conductivity of 0.5 ohm$^{-1}$cm$^{-1}$ as measured by the technique of Example 1. The doped complex is also insoluble at room temperature in common organic solvents.

EXAMPLE 9

One Step Preparation of Poly(3-(n-butyl)thiophen-2,5-diyl) from 3-(n-Butyl)thiophene This example describes the polymerization of 3-alkylthiophene monomers to directly give a solution of the conductive form of the polymer. Treatment of 3-n- butylthiophene in dry nitromethane with 2.2 equivalents of NOSbF$_6$ in dry nitromethane resulted in a gradual change in the solutions color from clear to deep red to deep blue with production of a gaseous by-product. Within just a few minutes, the reaction was over and a deep blue solution of doped poly(3-(n-butyl)thiophen-2,5-diyl) was obtained from which conductive materials can be cast. This solution was also used to both dope and coat a piece of neutral polyacetylene film. The resulting dip-coated film displayed a conductivity of 15 ohm$^{-1}$cm$^{-1}$. This film also exhibited improved air stability over polyacetylene films doped with NOSbF$_6$ but not coated with the poly(thiophene).

EXAMPLE 10

Preparation of Copolymer of 3-Methylthiophene and 3-Butylthiophene

This example describes a procedure for preparing a copolymer of 3-methylthiophene and 3-butylthiophene, and can be used as a general procedure for other copolymers of differing co-monomer proportions. To a stirred solution of 2,5-diiodo-3-methylthiophene (3.50 g, 0.01 mole) and 2,5-diiodo-3-n-butylthiophene (3.92 g, 0.01 mole) in dry 2-methyl-tetrahydrofuran (50 ml) was added magnesium turning (0.486 g, 0.02 mole) in one portion. After gentle refluxing overnight, dibromo[1,3-bis(diphenyl phosphino)propane] nickel (II) (0.3 g) was added in one portion and the mixture was refluxed again overnight. After evaporating the solvent, the residue was stirred in ethanol for 2 hours then in 2N HCl for 2 hours. The red solid was dried, then soxhlet extracted with hot ethanol to remove catalyst residues (1.75 g). The remaining insoluble polymer was then extracted with hot tetrahydrofuran to give a tetrahydrofuran soluble and tetrahydrofuran insoluble fraction. The tetrahydrofuran insoluble fraction was then further extracted with hot xylene. Nearly all of the tetrahydrofuran insoluble fraction dissolved in xylene. The tetrahydrofuran soluble fraction was found to have an average degree of polymerization (number of connected thiophene rings) of 134. On casting this fraction from tetrahydrofuran, only brittle, non-freestanding films were obtained. The xylene soluble fraction was found to have an average degree of polymerization of 294. On casting from solution, freestanding, flexible films with good strength resulted. This material can be doped with common dopants such as I$_2$, NOSbF$_6$, NOPF$_6$ and the like to provide a highly conductive, air stable doped copolymer.

EXAMPLE 11

Preparation of a Copolymer of 3-Methylthiophene and 3-(n-Octyl)thiophene

A copolymer comprising 3-methylthiophene and 3-(n-octyl)thiophene with a 50:50 ratio, respectively, of monomers was prepared by the method of Example 10. This copolymer was readily soluble in common organic solvents such as hexane, toluene, tetrahydrofuran, CH$_2$Cl$_2$ and the like. A hot tetrahydrofuran extract of the crude product afforded copolymer with an average degree of polymerization (corresponding to the number of connected thiophene rings) of 108 corresponding to an average molecular weight of 15,600. Cast polymer gave nice, flexible, tough freestanding films which on treatment with NOSbF$_6$ in nitromethane gave flexible films with a conductivity of 12 S/cm.

EXAMPLE 12

Fabrication of Conductive Polymer Films

This example describes the spray coating of a neutral copolymer of 3-butylthiophene and 3-methylthiophene, followed by iodine doping to give a highly conductive coating on the surfaces of paper, glass, metal, and plastic substrates. Solutions of the co-polymer of 3-butylthiophene and 3-methylthiophene were prepared by dissolving the copolymer (0.25 g) in THF (10 ml). These solutions were viscious enough such that free standing films could be cast. Likewise, these solutions could be used to cast or spray coat very thin coatings onto a variety of substrates (glass, metal, paper, plastic, etc.). By carefully controlling the amount of solvent, compositions with enough viscosity could be obtained to successfully silkscreen patterns onto paper, glass, or plastic substrates. These patterns and coatings were subsequently rendered highly conductive (1–4 ohm$^{-1}$cm$^{-1}$) by doping with iodine or with solutions of nitrosonium salts in CH$_2$Cl$_2$. Thus, coatings for EMI shielding applications and conductive traces for low-current circuitry can be readily fabricated.

EXAMPLE 13

A. Dimer Synthesis n-Butyl lithium, 2.69 g (42 millimoles), was added at 0° C. to 5.89 g (42 millimoles) of 2-n-butyl thiophene in 2-methyl tetrahydrofuran. The solution was warmed to room temperature, then refluxed for one hour. The solution of lithiated 2-n-butyl thiophene was then chilled to 0° C. and 10.85 g (42 millimoles) of magnesium bromide etherate added to form the Grignard reagent at the lithiated, five position on the thiophene ring followed gentle reflux for one hour. The solution was again cooled to 0° C. and 7.44 g (42 millimoles) of 2-bromo-3-methyl thiophene were added dropwise followed by addition of one mole percent (0.265 g.) of bis (1,3-diphenylphosphine) propane nickel (II) bromide. After refluxing for one hour, the reaction mixture was stirred at room temperature overnight.

The reaction mixture was slowly poured into 500 ml ice cold 2N HCl and stirred for twenty minutes. Two extractions with diethyl ether were performed and the ether fractions washed with aqueous NaHCO$_3$ and then with water. The ether extracts were dried over anhydrous magnesium sulfate, filtered, and the ether stripped away under vacuum. A dark, oily liquid remains. Distillation under vacuum at 100° C. separates lower boiling starting materials from the dimer products. After distillation, the dimer was passed through a silicon gel chromatography column using cyclohexane as the eluting solvent. The yield of the dimer (I) was 8 g., an 80% yield.

B. Diiodination of Dimer

Eight grams (33.8 millimoles) of the dimer (I) of Step A. were added to 150 milliliters of toluene and the solution was cooled to 0° C. Mercuric oxide (13.52 g, 62.3 millimoles), and iodine (17.7 g, 69.7 millimoles), were added in parts to the stirred solution over a one hour period. When the dark purple color of iodine in solution had vanished, twenty percent more iodine (3.4 g.) was added. The reactants were stirred at room temperature overnight.

The reaction slurry was filtered and the filtrate shaken with an aqueous solution of sodium thiosulfate.

The organic layer was subsequently washed with water and dried over anhydrous magnesium sulfate. After vacuum removal of solvent, the yellow oil remaining was run through a silica gel chromatography column with cyclohexane to provide 15.42 g. of the product, a 93% yield.

C. Synthesis of Copolymer

Magnesium was reacted with the diiodinated dimer (II) of Step B. to form the Grignard reagent. In 2-methyl tetrahydrofuran, 7.91 g. (16.2 millimoles) of the diiodinated dimer was reacted with an equimolar amount, 0.394 g., of magnesium. After the magnesium had been consumed the 2-methyl tetrahydrofuran was removed and twenty-three milliliters of anisole distilled from lithium hydride was added. The reactants were placed under an argon blanket, heated to 50° C., and one mole percent (0.102 g.) of bis (1,3-diphenylphosphino)-propane nickel (II) bromide was added in one dose. Within 5 minutes a thick soup had formed. The temperature of reaction was held for one hour each at 50° C., 70° C., and then 85° C. Finally the syrup was stirred for 12 hours at 100° C.

When cooled, the reactants formed a dark maroon clot, which was scraped into a blender containing 25 milliliters of concentrated hydrochloric acid, 75 milliliters of water, and 100 milliliters of methanol, then blended twice in 20% tetrahydrofuran/acetone. The residue from these blender extractions was placed in a Soxhlet apparatus. First tetrahydrofuran, then xylene was used to provide extracts suitable for casting into polymer films.

The films of 3-methyl/3-n-butyl thiophene copolymer are dark red. They were treated with a saturated solution of anhydrous ferric chloride in 85% nitromethane/15% toluene for 6 minutes. Conductivities of these stereoregular copolymer films were found to be 140 S/cm as measured by a four-point conductivity apparatus. This contrasts to lower values of 50 S/cm found for the 3-methyl/3-n-butyl thiophene (50/50) random copolymer treated with ferric chloride in the same way.

What is claimed is:

1. An electrically conductive solution comprising;
   (a) an organic solvent other than a chloroalkane;
   (b) a dopant solute; and
   (c) a doped homopolymer or co-polymer of film forming molecular weight, said polymer of the formula

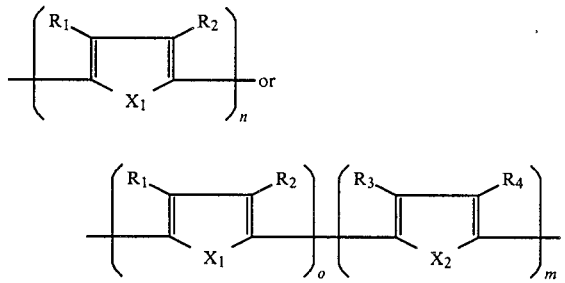

wherein:
   $n$ is a natural number and greater than 100;
   $o$ and $m$ are the same or different and are natural numbers wherein the sum of $o$ and $m$ is greater than 100, wherein the ratio of $m$ to $o$ can vary from zero to infinity;
   $R_1$ is alkyl, alkenyl, alkoxy, alkanoyl, alkylthio, aryloxy, alkylthioalkyl, alkylsulfinylalkyl, alkylsulfonylalkyl, alkylaryl, arylalkyl, cycloalkyl, alkylsulfinyl, alkylsulfonyl, aryl, arylthio, cycloalkenyl, arylsulfinyl, arylsulfonyl, or alkyl substituted with a sulfonic acid, halo, nitro, cyano, carboxylic acid or epoxy moiety;
   $R_2$, $R_3$, and $R_4$ are the same or different and are hydrogen, methyl or $R_1$; or any of
   $R_1$ and $R_2$, or $R_3$ and $R_4$ substituents taken together are an alkylene or alkenylene group completing a 3, 4, 5, 6 or 7 membered ring system, which ring may optionally include one or more divalent heteroatoms of sulfur, sulfinyl, sulfonyl or oxygen; and
   $X_1$ and $X_2$ are the same or different and are divalent S, O, Se, $NR^5$ or $PR^5$, wherein $R^5$ is hydrogen, alkyl or aryl.

2. A solution according to claim 1 wherein $R_1$, $R_2$, $R_3$ and $R_4$ individually do not include more than about 30 carbon atoms.

3. A solution according to claim 3 wherein $R_1$, $R_2$, $R_3$ and $R_4$ individually do not include more than about 20 carbon atoms.

4. A solution according to claim 1 wherein n, or the sum of o and m is equal to or greater than about 125.

5. A solution according to claim 4 wherein n, or the sum of o and m is equal to or greater than about 150.

6. A solution according to claim 5 wherein n, or the sum of o and m is equal to or greater than about 200.

7. A solution according to claim 6 wherein n, or the sum of o and m is equal to or greater than about 250.

8. A solution according to claim 7 wherein n, or the sum of o and m is equal to or greater than about 300.

9. A solution according to claim 1 wherein said polymer is doped with an electron acceptor dopant.

10. A solution according to claim 9 wherein said dopant is selected from the group consisting of $I_2$, $AsF_5$, $AlCl_3$, $NOBF_4$, $NOPF_6$, $NOSbF_6$, $NOAsF_6$, $NOCH_3SO_3$, $NO_2BF_4$, $NO_2PF_6$, $NO_2AsF_6$, $NO_2SbF_6$, $NO_2CF_3SO_3$, $HClO_4$, $HNO_3$, $H_2SO_4$, p-toluenesulfonic acid, benzoylperoxide, $CF_3SO_3H$, $SO_3$, $Br_2$, $(FSO_3)_2$, $FSO_3H$, $Fe(ClO_4)_3$, $FeCl_3$, $Fe(OTs)_3$, $Fe(CF_3SO_3)_3$, $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$ and $AgOTs$.

11. A solution according to claim 1 having an electrical conductivity equal to or greater than about $10^{-7}$ ohm$^{-1}$ cm$^{-1}$.

12. A solution according to claim 11 wherein said conductivity is equal to or greater than about $10^{-3}$ ohm$^{-1}$ cm$^{-1}$.

13. A solution according to claim 12 wherein said conductivity is equal to or greater than about $10^{-1}$ ohm$^{-1}$ cm$^{-1}$.

14. A solution according to claim 13 wherein said conductivity is equal to or greater than about $10^1$ ohm$^{-1}$ cm$^{-1}$.

15. A solution according to claim 1 wherein:
   $R_1$ is alkyl or alkenyl each containing from about 4 to about 30 carbon atoms, alkylphenyl or phenylalkyl each of which contains from about 7 to about 18 carbon atoms, alkylthio or alkoxy each containing from 1 to about 12 carbon atoms, phenyl or alkyl having from about 1 to about 12 carbon atoms substituted with epoxy, nitro, cyano, sulfonic acid, carboxylic acid or halo substituents;

$R_2$, $R_3$ and $R_4$ are the same or different at each occurrence and are hydrogen, methyl or $R_1$; or any of $R_1$ and $R_2$, $R_3$ and $R_4$ substituents taken together may form an alkylene or alkenylene chain having from 2 to 20 carbon atoms completing a 4,5 or 6 membered ring system which may include one or more heteroatoms of divalent oxygen or sulfur; and $X_1$ and $X_2$ are the same or different and are divalent S, O or $NR_5$ wherein $R_5$ is alkyl having from 1 to about 7 carbon atoms or hydrogen.

16. A solution according to claim 15 wherein:

$R_1$, $R_2$, $R_3$ and $R_4$ are the same or different at each occurrence and are hydrogen or alkyl, with the proviso that at least one of $R_1$ and $R_3$ is alkyl having from about 4 to about 20 carbon atoms; and $X_1$ and $X_2$ are the same or different and are sulfur or oxygen.

17. A solution according to claim 16 wherein at least one of $R_1$ and $R_3$ is alkyl having from about 4 to about 20 carbon atoms.

18. A solution according to claim 1 wherein said polymer is a homopolymer or copolymer wherein:

$R_1$ is alkyl having from about 4 to about 20 carbon atoms;

$R_3$ is hydrogen or alkyl having from 1 to about 20 carbon atoms;

$R_2$ and $R_4$ are hydrogen; and $X_1$ and $X_2$ are sulfur.

19. A solution according to claim 10 wherein said polymer is a homopolymer.

20. A solution according to claim 10 wherein said polymer is a copolymer.

21. A solution according to claim 20 wherein said copolymer is stereoregular.

22. A solution according to claim 18 wherein:

$R_1$ is alkyl having from about 5 to about 20 carbon atoms; and $R_3$ is alkyl having from 1 to about 12 carbon atoms.

23. A solution according to claim 22 wherein:

$R_1$ is alkyl having from about 4 to about 20 carbon atoms; and $R_3$ is alkyl having 1 to about 4 carbon atoms.

24. A solution according to claim 23 wherein:

$R_1$ is alkyl having from about 4 to about 12 carbon atoms; and $R_3$ is methyl.

25. A solution according to claim 1 wherein said solvent has a dielectric constant equal to or less than about 70, and a dipole moment of greater than zero and less than or equal to about 5.

26. A solution according to claim 25 wherein said dielectric constant is from about 2 to about 65, said dipole moment is from about 0.3 to about 5.

27. A solution according to claim 26 wherein said dielectric constant is from about 20 to about 65, and said dipole moment is from about 2.5 to about 5.

28. A solution according to claim 25 wherein said solvent is selected from the group consisting of cyclic and linear ethers, aromatic solvents, sulfones, nitrosubstituted alkanes or aromatics, nitriles, hydrocarbons, sulfoxides, amides and carbonates.

29. A solution according to claim 25 wherein said solvent is selected from the group consisting of toluene, tetrahydrofuran, dimethylformamide, benzonitrile, acetonitrile, nitropropane, hexane, propylene carbonate, dimethoxyethane, dimethylsulfoxide, xylene, nitrobenzene and N-methylpyrrolidone.

30. A method of forming a conductive article which comprises the steps of
(a) forming the solution of claim 1; and
(b) removing from the solution the solvent as the polymer solute solidifies to form said conductive article.

31. The process of claim 30 wherein said solvent is removed by evaporation.

32. The process of claim 31 wherein the solution is subjected to evaporation on a substrate so as to form a film on said substrate.

33. The process of claim 31 wherein the solution is subjected to evaporation in a shaped mold so as to form a shaped article.

34. The process of claim 31 wherein said solution is subjected to evaporation in the presence of a substrate insoluble in said solution so as to form a coating on the substrate.

35. The process of claim 30 wherein said solvent is removed by extraction into a non-solvent for the conductive article.

36. A conductive article manufactured in accordance with the method of claim 30.

37. A conductive article according to claim 36 wherein the conductivity of said conductive article is equal to or greater than about $10^{-7}$ ohm$^{-1}$ cm$^{-1}$.

38. A conductive article according to claim 37 wherein said conductivity is equal to or greater than about $10^{-3}$ ohm$^{-1}$ cm$^{-1}$.

39. A conductive article according to claim 38 wherein said conductivity is equal to or greater than $10^{-1}$ ohm$^{-1}$ cm$^{-1}$.

40. A conductive article according to claim 39 wherein said conductivity is equal to or greater than about $10^0$ ohm$^{-1}$ cm$^{-1}$.

41. A conductive article according to claim 40 wherein said conductivity is equal to or greater than about $10^1$ ohm$^{-1}$ cm$^{-1}$.

42. A solution comprising:
(a) an organic solvent, and
(b) a homopolymer or co-polymer of film forming molecular weight, said polymer of the formula:

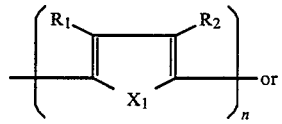

or

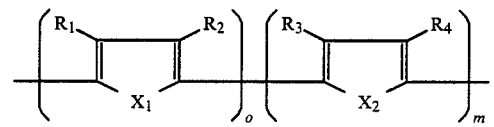

wherein:

n is a natural number greater than 100;

o and m are the same or different and are natural numbers whose sum is greater than 100 wherein the ratio of m to o can vary from zero to infinity;

$R_1$ is alkyl, alkenyl, cycloalkyl, cycloalkenyl, alkoxy, alkanoyl, alkylthio, aryloxy, alkylthioalkyl, alkylaryl, alkylsulfonylalkyl, arylalkyl, alkylsulfinyl, alkylsulfonyl, aryl, arylthio, alkylsulfinylalkyl, arylsulfinyl, arylsulfonyl, or alkyl substituted with a sulfonic acid, halo, carboxylic acid, nitro, cyano or epoxy substituents;

$R_2$, $R_3$, $R_4$ are the same or different at each occurrence and are hydrogen, methyl or $R_1$; or any of $R_1$ and $R_2$, or $R_3$ and $R_4$ substituents taken together are an alkylene or alkenylene group completing a 3, 4, 5, 6, or 7 membered ring system, which ring may optionally include one or more divalent heteroatoms of sulfur, sulfinyl, sulfonyl or oxygen, with the proviso that when any $R_1$, $R_2$, $R_3$ or $R_4$ substituent is other than hydrogen, such substituent includes from about 5 to about 30 carbon atoms; and $X_1$ and $X_2$ are the same or different and are divalent S, O, Se, $NR_5$, or $PR_5$ wherein $R_5$ is hydrogen, alkyl having from 1 to about 7 carbon atoms or aryl having from 6 to about 14 carbon atoms.

43. A solution according to claim 42 wherein said solvent is selected from the group consisting of solvents having a dielectric constant of less than about 70 and a dipole moment of from 0 to about 3.0.

44. A solution according to claim 43 wherein said dielectric constant is from about 2 to about 35 and said dipole moment is from about 0 to about 2.5.

45. A solution according to claim 44 wherein said dielectric constant is from about 2 to about 20, and said dipole moment is from 0 to about 2.0.

46. A solution according to claim 44 wherein said solvent is selected from the group consisting of halocarbons, aromatic solvents, cyclic and linear ethers, hydrocarbons, esters, sulfoxides, amides, nitro compounds, ketones and nitriles.

47. A solution according to claim 45 wherein said solvent is selected from the group consisting of chloroform, methylene chloride, toluene, tetrahydrofuran, dimethylformamide, hexane, ethylacetate, dimethoxyethane, xylene, nitropropane, dimethylsulfoxide, nitrobenzene, benzonitrile and N-methylpyrrolidinone.

48. A solution according to claim 45 wherein said solvent is selected from the group consisting of nitroalkane, halocarbon, amide, aromatic and ether solvents.

49. A solution according to claim 42 wherein said solvent is selected from the group consisting of methylene chloride, toluene, tetrahydrofuran, nitropropane, dimethylformamide, and xylene.

50. A method of forming a conductive article which comprises the steps of
   (a) forming the solution of claim 42;
   (b) removing from the solution the solvent as the polymer solute solidifies; and
   (c) doping the solidified polymer with an electron acceptor dopant to form a conductive solidified polymer.

51. A method according to claim 50 wherein the solidified polymer is doped by contacting the polymer with a solution of said dopant in a non-solvent for the neutral and doped polymer.

52. A method according to claim 50 wherein said solvent is removed by evaporation.

53. A method according to claim 52 wherein said solution is subjected to evaporation on a substrate so as to form a film.

54. The process of claim 52 wherein the solution is subjected to evaporation in a shaped mold so as to form a shaped article.

55. The process of claim 52 wherein said solution is subjected to evaporation in the presence of a substrate insoluble in said solution so as to form a coating on the substrate.

56. The process of claim 50 wherein said solvent is removed by extraction into a non-solvent for the polymer.

57. A conductive article formed in accordance with the method of claim 50 having a conductivity of at least about $10^{-7}$ ohm$^{-1}$ cm$^{-1}$.

58. A conductive article according to claim 57 wherein said conductivity is at least about $10^{-3}$ ohm$^{-1}$ cm$^{-1}$.

* * * * *